Jan. 12, 1954  E. F. STOVER  2,665,707
FLUID PRESSURE CONTROL APPARATUS
Filed March 13, 1951  2 Sheets-Sheet 1
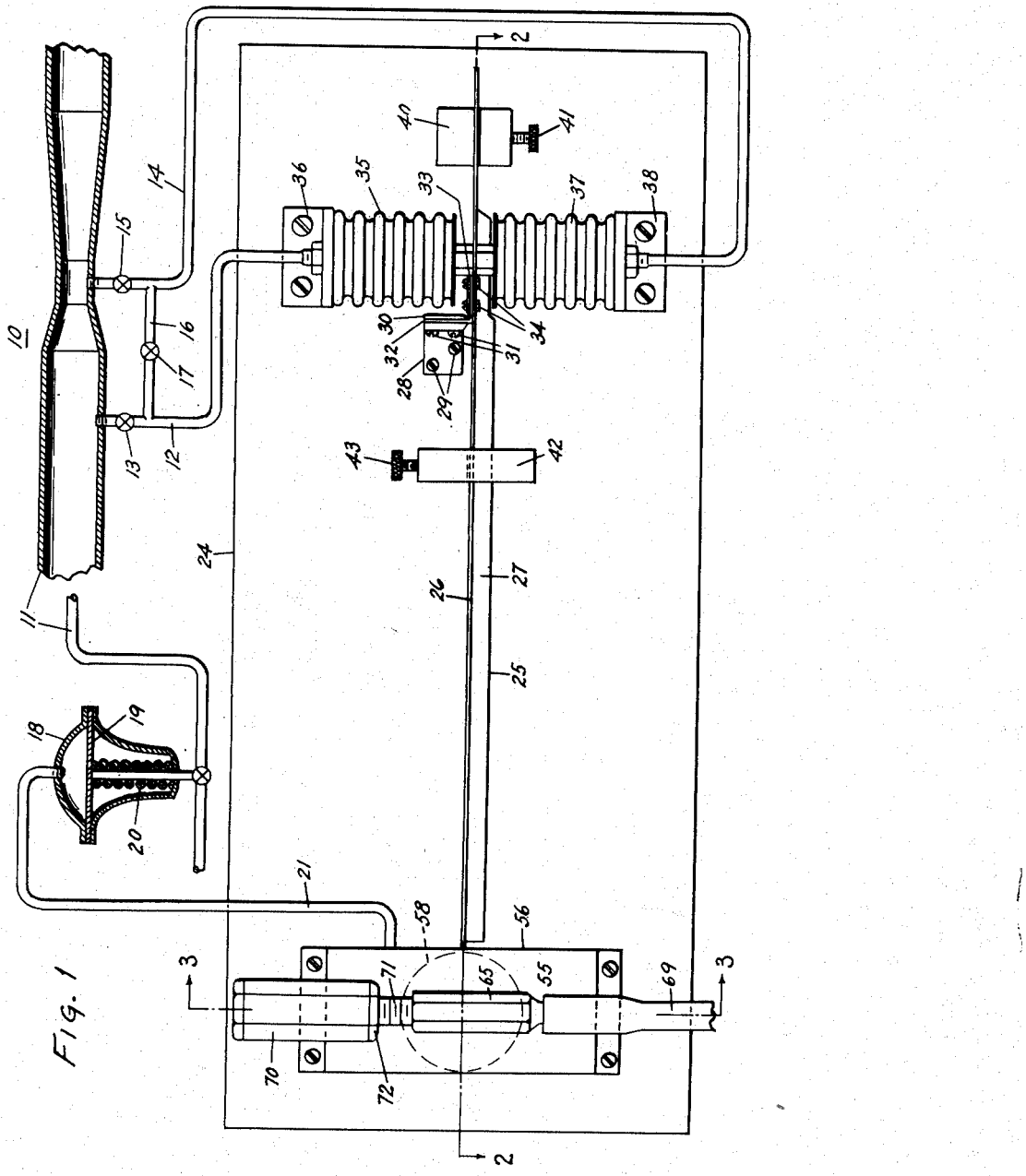
INVENTOR.
EMORY FRANK STOVER
BY
ATTORNEY Jan. 12, 1954
E. F. STOVER
2,665,707
FLUID PRESSURE CONTROL APPARATUS
Filed March 13, 1951
2 Sheets-Sheet 2
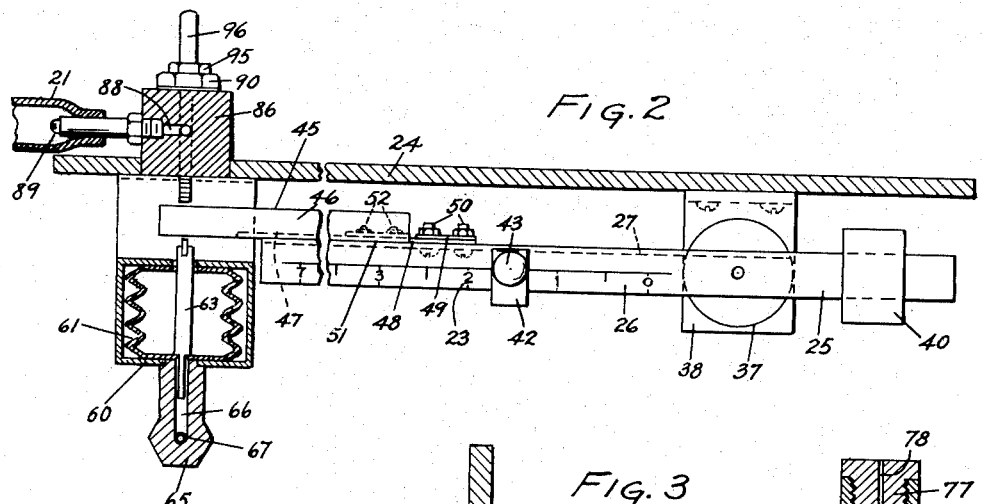
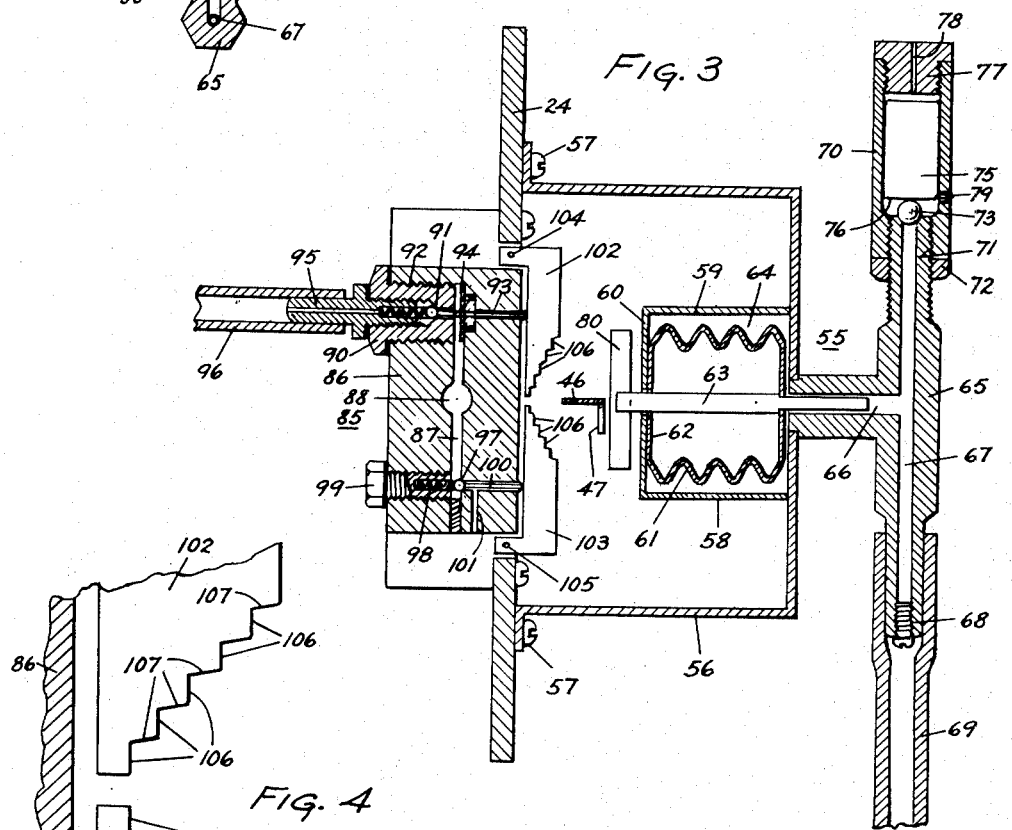
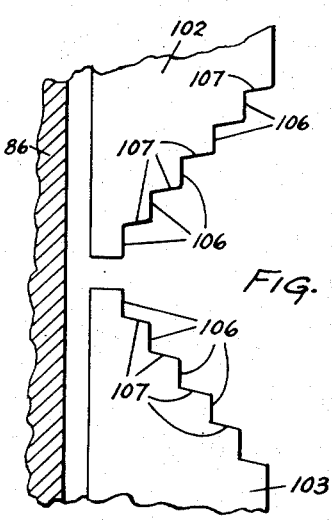
INVENTOR.
EMORY FRANK STOVER
BY
ATTORNEY Patented Jan. 12, 1954

2,665,707

UNITED STATES PATENT OFFICE 2,665,707

FLUID PRESSURE CONTROL APPARATUS

Emory Frank Stover, Wynnewood, Pa.

Application March 13, 1951, Serial No. 215,204

7 Claims. (Cl. 137—486)

This invention relates to control apparatus and more particularly to apparatus for supplying fluid under pressure to fluid actuated control devices, such as regulating valves, for controlling a variable, such as the flow of fluid, at predetermined rates.

It is the principal object of the present invention to provide control mechanism which is adapted, at predetermined intervals, to test the correctness of a controlled variable, and if adjustment is required, to provide an adjustment of large magnitude for large deviations, of smaller magnitude for smaller deviations and of zero magnitude for zero deviation.

It is a further object of the present invention to provide control apparatus, responsive to a controlled variable, in which departures, or deviations from the prescribed value are utilized to effect an adjustment.

It is a further object of the present invention to provide, in apparatus of the character aforesaid, an improved fluid pressure operated sensing mechanism functioning at predetermined or cyclical intervals.

It is a further object of the present invention to provide, in apparatus of the character aforesaid, an improved time controlled sensing and correcting apparatus.

Other objects and advantageous features of the invention will be apparent from the specification and claims.

The nature and characteristic features of the invention will be more readily understood from the following description, taken in connection with the accompanying drawings forming part hereof, in which:

Figure 1 is a front elevational view, partly diagrammatic, of control apparatus in accordance with the present invention;

Fig. 2 is a horizontal sectional view taken approximately on line 2—2 of Fig. 1;

Fig. 3 is a fragmentary sectional view, enlarged, taken approximately on line 3—3 of Fig. 1; and Fig. 4 is a fragmentary view, enlarged, of the pilot valve control levers.

It should, of course, be understood that the description and drawings herein are illustrative merely and that various modifications and changes can be made in the structure disclosed without departing from the spirit of the invention.

Like numerals refer to like parts throughout the several views.

Referring more particularly to the drawings, in which a preferred embodiment of the invention is illustrated, a primary metering device is shown which is adapted for obtaining a differential pressure or force derived from fluid flow through conduits in which Venturi tubes, orifices, nozzles or pitot tubes are connected, or from Pitot tubes employed for obtaining the speed of ships, aeroplanes or the like. For purposes of explanation, the primary metering device is shown in the form of a Venturi tube 10 connected in a conduit 11 for measuring the rate of flow of fluid through the conduit 11.

The upstream or high pressure side of the primary metering device 10 has a pipe 12 connected thereto, a shut-off valve 13 being provided in the pipe 12. The downstream or lower pressure portion of the primary metering device 10 has a pipe 14 connected thereto, a shut-off valve 15 being provided in the pipe 14. The pipes 12 and 14 are connected by a by-pass pipe 16 having a shut-off valve 17 interposed therein.

A motor operated valve 18, preferably of the diaphragm type, and having a diaphragm 19 and spring 20 is provided in the conduit 11 for controlling the fluid flow therethrough. A pipe 21 is provided, connected above the diaphragm 19, for the delivery of control pressure fluid.

At any preferred location with respect to the primary metering device 10, a vertical mounting or supporting plate 24 is provided, having a pivoted lever 25 mounted thereon.

The lever 25 preferably is of angle stock with a horizontal flange 26 and a vertical flange 27, and if desired the horizontal flange may have rate seting indicia 23 thereon.

The lever 25 is preferably mounted on the plate 24 with a suitable fulcrum for movement in a vertical plane and for this purpose a bracket 28 fixedly secured on the plate 24 by bolts 29, may have clamped thereto by a clamping plate 30, and bolts 31, a thin flexible bronze fulcrum strip 32 which is also secured by a clamping plate 33 and bolts 34 to the flange 26 of the lever 25.

At a predetermined location with respect to the lever 25, a flexible metallic bellows 35 is provided, supported at one end by a fixed supporting bracket 36 secured to the plate 24 and having its free end in engagement with the flange 26 of the lever 25 for applying a force thereon. The pipe 12 is connected in communication with the interior of the bellows 35.

A second flexible metallic bellows 37 is provided, preferably axially alined with the bellows 35, is supported at one end by a fixed supporting bracket 38 secured to the plate 24 and having its free end in engagement with the flange 26 of the lever 25 for applying a force thereon. The pipe 14 is connected in communication with the interior of the bellows 37.

The bellows 35 and 37 are preferably of equal effective area, so that the differential of the pressure from the primary metering device 10 is effective as a resultant force applied on the lever 25.

The lever 25 preferably has a counterweight 40, movable therealong and the weight 40 is adapted to be held in the desired position of adjustment on the lever 25 by means of a screw 41, for zero balance. The lever 25 is also preferably provided with a loading device, such as a weight 42, movable along the lever 25, and the weight 42 is adapted to be held in the desired position of adjustment by means of a screw 43, for determining the prescribed value of the variable, the indicia 23 aiding in making the desired setting.

The lever 25 preferably has mounted thereon, on the rear face of the flange 27, a control lever 45, which extends beyond the free end of the lever 25.

The control lever 45 is preferably also made from a piece of angle stock, with a horizontal flange 46 and a vertical flange 47. A flexible fulcrum strip 48 is provided, similar to the strip 32, is secured to the vertical flange 27 of the lever 25 by a clamping plate 49 and bolts 50, and is secured by a clamping plate 51 and bolts 52 to the vertical flange 47. The lever 45, as thus mounted is adapted for movement rearwardly in a direction at right angles to the lever 25.

Beyond the end of the lever 25, and for moving the lever 45, a servo-motor 55 is provided, and is carried by a mounting bracket 56 secured to the plate 24 by screws 57, and is provided with a casing 58, secured to the bracket 56 in fluid tight relationship, and having a cylindrical side wall 59 and a circular end wall 60. Within the interior of the casing 58, a flexible metallic bellows 61 is provided. The bellows 61 has an end closure 62 which is secured at one end in fluid tight relationship to the wall 60. The opposite end of the bellows 61 has a stem 63 secured thereto in any desired manner and extending therethrough.

The space between the exterior of the bellows 61 and the interior of the casing 58 provides an expansible fluid pressure chamber 64.

The servo-motor 55 has a body portion 65 with a bore 66 therein into which the stem 63 extends and by which the stem 63 is guided and supported. The body portion 65 preferably has another bore 67, preferably vertically disposed and in communication with the bore 66. The bore 67, at its lower end is provided with an adjustable bleeder screw 68 in internally threaded engagement in the lower end of the bore 67.

A fluid supply connection 69, is provided in communication with the lower end of the bore 67 for supplying pressure regulated and filtered fluid, such as air, from any desired source. The screw 68, by its adjustment inwardly or outwardly in the bore 67, provides a regulated feed of pressure fluid for outward actuation of the stem 63.

On the upper end of the body portion 65, a housing 70 is provided, interiorly threaded for engagement with an externally threaded portion 71 of the body 65, a sealing sleeve 72 being provided for preventing the escape of pressure fluid at this location.

Within the housing 70, and at the upper end of the bore 67, a valve ball 73 is provided seating in the upper end of the bore 67, and in the space in the interior of the housing 70, above the ball 73, a weight 75 is provided of predetermined mass, and in the form of a piston with a lower end face 76.

The upper end of the housing 70 is closed by a closure plug 77. The closure plug 77 has a vent 78, communicating with the atmosphere, for permitting the free upward and downward movement of the weight 75.

In the side wall of the housing 70, a port 79 is provided, in communication with the atmosphere for the discharge of fluid.

The outer end of the stem 63 has a vertical presser bar 80 carried thereon for engagement between its ends with the flange 46 of the lever 45.

The plate 24 has mounted, on the rear thereof, a supply and waste type pilot valve 85 which has a body 86 with a central bore 87. The bore 87 has a passageway 88 in communication therewith to which the pipe 21 is connected. If desired a variable restriction screw 89 may be provided in the pipe 21, at the body portion 86, for delaying the delivery and discharge of motor fluid. The body 86 has mounted thereon, preferably by a fitting 90, in threaded engagement therewith, an inlet valve ball 91 normally moved to closed position by spring 92. The valve ball 91 has a stem 93 in engagement therewith and the stem 93 extends across the bore 87 and through a soft rubber sealing disk 94, and projects beyond the body 86 for actuation of the valve ball 91.

Within the fitting 90, a supply fitting 95 is provided, with which fluid supply connection 96 is in communication. The supply connection 96 is connected to any suitable source of regulated and filtered pressure fluid, such as air.

The valve body 86 also is provided with a discharge valve ball 97, normally moved to closed position by a spring 98. The spring 98 is in engagement at its opposite end with a closure plug 99. The valve ball 97 is provided with a stem 100 in engagement therewith which extends through its seat and outwardly beyond the body 86, for actuation. A discharge port 101 is provided in communication with the atmosphere for the discharge of fluid in addition to that which might discharge along the stem 100.

A pair of valve actuating levers 102 and 103 is provided, pivotally mounted by means of pivot pins 104 and 105. The lever 102 extends downwardly past and is in engagement with the projecting portion of the valve stem 93 and the lever 103 extends upwardly past and is in engagement with the projecting portion of the valve stem 100. The free ends of the levers 102 and 103 are separated a predetermined distance, to permit the free movement therebetween of the horizontal flange 46 of the lever 45 under certain conditions. Extending outwardly from the free ends of the levers 102 and 103, each of these levers has a plurality of stepped faces 106, with edge portions 107 sloped to prevent locking of the flange thereagainst.

The mode of operation will now be pointed out.

With the fluid flow through the conduit 11 at a rate of flow determined by the positioning of the motor valve 18, pressure will be effective through the pipe 12 and in the interior of the bellows 35 and pressure will also be effective through the pipe 14 and in the interior of the bellows 37. The differential pressure effective from the primary metering device is thus applied on the lever 25. For normal conditions of equilibrium and for setting for a prescribed value of the variable, as determined by the setting of the weight 42, the lever 25 will be held in a predetermined position.

Fluid under pressure supplied through the supply connection 96 is vailable at the pilot valve 85, and fluid under pressure supplied through the supply connection 69 is available at the servo-motor 55.

The functioning of the servo-motor 55 will now be described. Fluid from the supply connection 69 passes at a slow rate past the bleeder screw 68 and enters the bore 66, the cross-bore 67 and the chamber 64 and slowly compresses the bellows 61, thus advancing the stem 63 and the presser bar 80. As the pressure increases in the bore 66, the valve ball 73 is finally lifted slightly from its seat and the first escape of pressure fluid raises the pressure on the lower end face 76 of the weight 75. The weight 75 is moved quickly upwardly against the closure plug 77. The valve ball 73, being relieved of the effect of the weight 75, blows wide open, and the accumulated pressure fluid in the bores 66 and 67 and chamber 64, above the bleeder screw 68, is exhausted quickly through the port 79 to atmosphere. The spring action of the bellows 61 returns the assembly comprising the bellows 61, the stem 63, and the presser bar 80 to its original position. The weight 75 and the valve ball 73 drop back to their initial positions, with the valve ball 73 in seated position at the upper end of the bore 66, and the cycle is repeated. The travel of the presser bar 80 is determined by the value of the mass of weight 75, and the frequency of the cycle is determined by the setting of the bleeder screw 68 and the total volume of the bores 66 and 67 and the chamber 64.

The presser bar 80, upon its advancing movement, engages with the free end of the control lever 45 and moves it from a position parallel to the lever 25 and rearwardly towards the valve actuating levers 102 and 103.

If the existing rate of flow in the conduit 11 is in conformity with the setting of the weight 42, then upon the occurrence of the rearward movement of the control lever 45 the horizontal flange 46, of the control lever 45, will pass between the spaced free ends of the actuating levers 102 and 103 and no change will be effected at the pilot valve 85.

If the actual rate of flow in the conduit 11 does not agree with the setting, the free end of the lever 25 and the control lever 45 carried thereby, will be moved to a position out of the horizontal. If the actual flow is too high, upon the advancing movement of the stem 63, the presser bar 21 engages the control lever 45, at whatever its position may be, and forces it against the lever 102, opening the supply valve 91, and allowing pressure fluid to flow through the bore 87 and the passageway 88 to the pipe 21 and therethrough to the motor valve 18 to close the motor valve to the extent required to bring the flow down to the prescribed value.

If the original deviation was small, the horizontal flange 46 of the control lever 45 will engage the lowest stepped face 106 on the lever 102, and most of the cycle of the servo-motor 55 will have been terminated before this contact has been made. Thus, the time interval during which the supply valve 91 is open will be very short so that only a very small correction in the setting of the motor valve 18 will be made.

If the deviation is larger the horizontal flange 46 of the control lever 45 will engage a higher or the highest stepped face 106 on the lever 102, and the supply valve 91 will be held open for a longer period or even for the longest period available and will pass a considerably larger quantity of control fluid. The quantity of fluid for maximum time period of operation may be of the order of ten to fifteen times as great as for the shortest time period, when the lowest stepped face 106 is engaged.

In order to provide stability of control and to avoid hunting, it is desirable that the correction should always be less than the deviation to be corrected.

If the existing rate of flow is too low, a similar action will be effected with downward movement of the control lever 45 and engagement of the horizontal flange 46 thereof with one of the stepped faces 106 of the lever 103.

If the variable does not deviate from the set value and the flange passes between the ends of the levers 102 and 103 then the fluid in the motor valve control system is locked therein because both valves 91 and 97 remain closed. The only control fluid required is the small amount needed to actuate the servo-motor and this quantity is ordinarily small as compared to the waste from a continuous bleeder type of instrument.

It should be noted that if the pressure fluid supply should fail, the controlled variable will remain at its previous setting and will not have any tendency to drift to either extreme, as with a continuous bleeder type of instrument.

I claim:

1. In control apparatus, a control member movable in a predetermined plane path responsive to force changes of a variable condition, a fluid pressure operated motor having a portion movable in a predetermined timed cycle for moving an end extension of said member in another path normal to said first mentioned path, a pilot valve, an actuator for said pilot valve with which said movable portion is engageable, said actuator having a plurality of facing stepped surfaces for engagement by said member at different positions in said other path, and means adjustably mounted with respect to said control member for applying on said control member a force in opposition to the forces applied by the variable condition.

2. In control apparatus, a control member movable in a predetermined path responsive to changes in a variable condition, said control member having resiliently carried thereby an end extension movable in a path normal to said first mentioned path, a fluid pressure operated motor having a portion movable in a predetermined timed cycle for moving said extension in said normal path, a pilot valve, an actuator for said pilot valve with which said movable portion is engageable, said actuator having a plurality of facing stepped surfaces for engagement by said member at different positions in said other path and connecting surfaces between said stepped surfaces at an inclination for preventing locking engagement of said movable portion therewith.

3. In fluid pressure control apparatus, a first control member movable in a predetermined path in response to force changes of a variable condition, a loading member adjustably mounted with respect to said first control member for applying a force thereon opposing the force changes of the variable condition, a second control member resiliently carried by said first control member for movement in another path normal to said first mentioned path, a servo-motor having a movable portion for actuating said second control member and control means for effecting timed operation of said movable portion, a pilot valve having a connection to a source of pressure fluid and having supply and discharge valves, a fluid delivery connection interposed between said valves, and operating means for said valves having facing stepped surfaces for engagement by said movable portion, as determined by the positioning of said first control member.

4. In fluid pressure control apparatus, a first control member movable in a predetermined path in response to force changes of a variable condition, a loading member adjustably mounted with respect to said first control member for applying a force thereon opposing the force changes of the variable condition, a second control member resiliently carried by said first control member for movement in another path normal to said first mentioned path, a servo-motor having a movable portion for actuating said second control member and control means for effecting timed operation of said movable portion, a pilot valve having a connection to a source of pressure fluid and having supply and discharge valves, a fluid delivery connection interposed between said valves and pivoted members for operating said valves with respect to which said second control member is movable, said pivoted members having facing stepped surfaces for engagement by said movable portion as determined by the positioning of said first control member.

5. In fluid pressure control apparatus, a first control lever movable in a predetermined path in response to force changes of a variable condition, a loading member adjustably mounted with respect to said first control member for applying a force thereon opposing the force changes of the variable condition, a second control lever carried by said first control lever for movement in another path normal to said first mentioned path, a servo-motor having a movable portion for actuating said second control lever and control means for effecting timed operation of said movable portion, a pilot valve having a connection to a source of pressure fluid and having supply and discharge valves, a fluid delivery connection interposed between said valves, and operating means for selectively operating said valves including operating members for each of said valves transversely disposed with respect to said predetermined path and having a plurality of facing portions at different locations for engagement by said second control lever as determined by the positioning of said first control lever and having portions spaced to permit non-engaging movement of said second control lever.

6. In fluid flow control apparatus, a fluid flow conduit, a primary metering device in said conduit, a fluid pressure operated valve for controlling the flow through said conduit, a first control member movable in a predetermined path in response to changes in differential pressure at said primary metering device, a loading member adjustably mounted with respect to said first control member for applying a force thereon opposing the force changes of the variable condition, a second control member resiliently carried by said first control member for movement in another path normal to said first mentioned path, a servo-motor having a movable portion for actuating said second control member in said other path, said servo-motor having control means for effecting timed operation of said movable portion, a pilot valve having a connection to a source of pressure fluid and having supply and discharge valves, a fluid delivery connection interposed between said supply and discharge valves and connected to said fluid pressure operated valve, and operating means for selectively operating said supply and discharge valves including operating members for each of said valves transversely disposed with respect to said predetermined path and each having a plurality of facing stepped surfaces at different locations for engagement by said second control member as determined by the positioning of said first control member and having portions spaced to permit non-engaging movement of said second control member.

7. In fluid flow control apparatus, a fluid flow conduit, a primary metering device in said conduit, a fluid pressure operated valve for controlling the flow through said conduit, a first control lever movable in a predetermined path in response to changes in differential pressure at said primary metering device, a loading member adjustably mounted with respect to said first control member for applying a force thereon opposing the force changes of the variable condition, a second control lever fulcrumed on said first control lever for movement in another path normal to said first mentioned path, a servo-motor having a movable portion for moving said second control lever in said other path, said servo-motor having control means for effecting timed operation of said movable portion, a pilot valve having a connection to a source of pressure fluid and having supply and discharge valves, a fluid delivery connection interposed between said supply and discharge valves and connected to said fluid pressure operated valve, and operating means for selectively operating said supply and discharge valves including pivoted operating members for each of said supply and discharge valves transversely disposed with respect to said predetermined path and each having a plurality of facing stepped surfaces at different locations for engagement by said second control lever as determined by the positioning of said first control lever and having portions spaced to permit non-engaging movement of said second control lever.

EMORY FRANK STOVER.

References Cited in the file of this patent

UNITED STATES PATENTS

| Number | Name | Date |
|---|---|---|
| 965,824 | Leeds | July 26, 1910 |
| 1,007,521 | Boys et al. | Oct. 31, 1911 |
| 1,515,173 | Roucka | Nov. 11, 1924 |
| 1,585,170 | Roucka | May 18, 1926 |
| 1,987,200 | Mabey | Jan. 8, 1935 |
| 2,035,472 | Hammond | Mar. 31, 1936 |
| 2,430,503 | Greening | Nov. 11, 1947 |

FOREIGN PATENTS

| Number | Country | Date |
|---|---|---|
| 650,464 | France | Sept. 24, 1928 |